Figure 1:
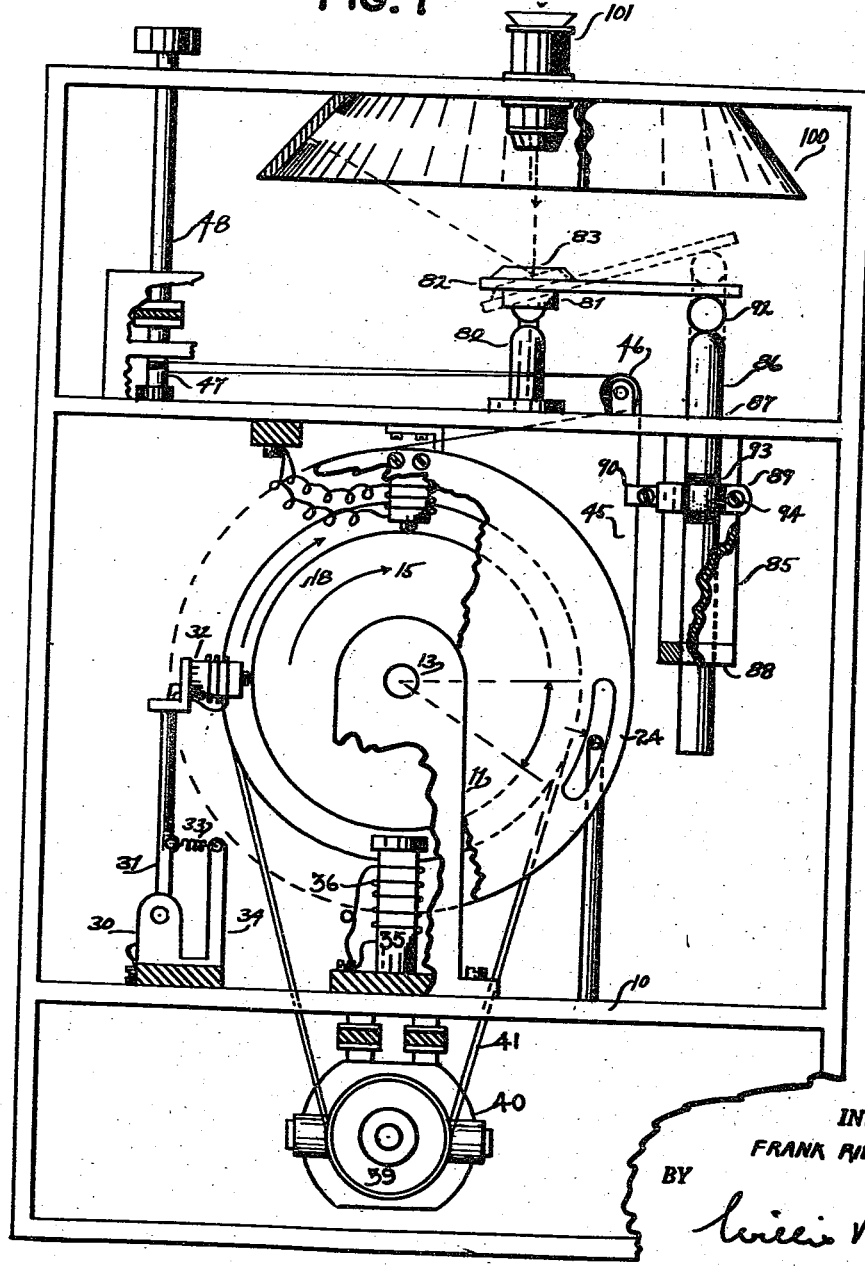

INVENTOR.
FRANK RIEBER

Patented July 29, 1947

2,424,773

UNITED STATES PATENT OFFICE 2,424,773

LOCATING DEVICE

Frank Rieber, New York, N. Y., assignor to Interval Instruments, Inc., New York, N. Y., a corporation of New York Application February 26, 1944, Serial No. 524,035

17 Claims. (Cl. 177—352)

This invention relates primarily to a device for making a record of a plurality of local responses in their proper sequence, such that the relative times of these responses may be determined from the record.

Within the broad aspects of this invention, the electrical quantities which are to be considered may be derived in any one of a number of ways. For example, a plurality of sets of impulses may be sent out from a distant station on separate channels and in a sequence in which the difference in time is of significance, so that the electrical impulses themselves come directly from the distant station.

It is an object of this invention to provide such an instrument which will enable minute differences in time to be determined and recorded instantaneously and with such accuracy that computations or deductions may be made from the record, even when the times concerned are very small.

In its more particular application, however, this device is designed to measure the difference in time of arrival of sound signals at each of a plurality of stations, the location of which is known, so that the direction of the sound may be determined from the time sequence with accuracy. In this embodiment, therefore, the device uses some form of microphone responding to the sound and creating the electrical impulses whose difference in time the device records.

In the case of a sound which comes suddenly and is not repeated, it is desirable that the records shall be maintained until there has been opportunity to locate the sound origin, after which the record may be wiped clean.

In the case of a continuous sound, however, from a continuous signal source, such as from the machinery of a submarine, the electrical impulses from the microphones may be evaluated as they are being recorded and the recording surface may be continuously wiped clean.

I have chosen to illustrate in this description apparatus following both such principles, the first of these being in the form of a device for the locating of an enemy gun, and the second being for the locating of a vessel such as a submarine.

It is an object of this invention, therefore, to provide a device which will make separate records of the impulses received from a plurality of spaced microphones and which will automatically indicate the direction from which the sound is approaching by means of the delay which must be changing the relative times of reproduction of the various arriving records to bring them into synchronism with each other.

It is a further object to produce a device of this kind in which the determination of the direction may be made, automatically, by the same action which adjusts the time of reproduction of the records to bring them into harmony. More specifically, there is here disclosed a device for making a plurality of records of the same sound which will be separated in space in the direction of movement by an amount proportional to the difference in time of arrival of the sounds at the microphones and which may then be reproduced in a different timed sequence whereby these records are brought into synchronism with each other, by shifting the point of reproduction, an amount precisely equal to the spacing of the records, and then automatically, by the amount of shifting required to produce this result, determining the direction from which the sound is obtained.

It is, moreover, often necessary to determine the location of a particular sound at a time when a great many different sounds are also present, with which it is confused, that is, the instrument must permit the identification of a significant sound to the exclusion of other sounds with which it may be mingled, and to determine the relative times of arrival of the particular sound under consideration, without confusion with the others.

It is a further object to provide a device which simultaneously may make a record of all the necessary data concerning all of the wide variety of sounds which it receives and to make it in such a form that at any subsequent time we may evaluate the record of each particular sound separately, thus enabling us to determine the location of a plurality of differently spaced sound origins from the same record without confusion.

It is a further object to provide a device of the character described, such that the record may be retained in the device until it is no longer desired, and then it may readily be wiped out to prepare for another record.

It is a further object to provide a device which may be of such accuracy that the microphones may be placed relatively close together and the entire apparatus may be readily transported and easily set up.

The invention accordingly comprises a device possessing the features, properties and the relation of elements which will be exemplified in the article hereinafter described and the scope of the application of which will be indicated in the claims.

Figure 2:
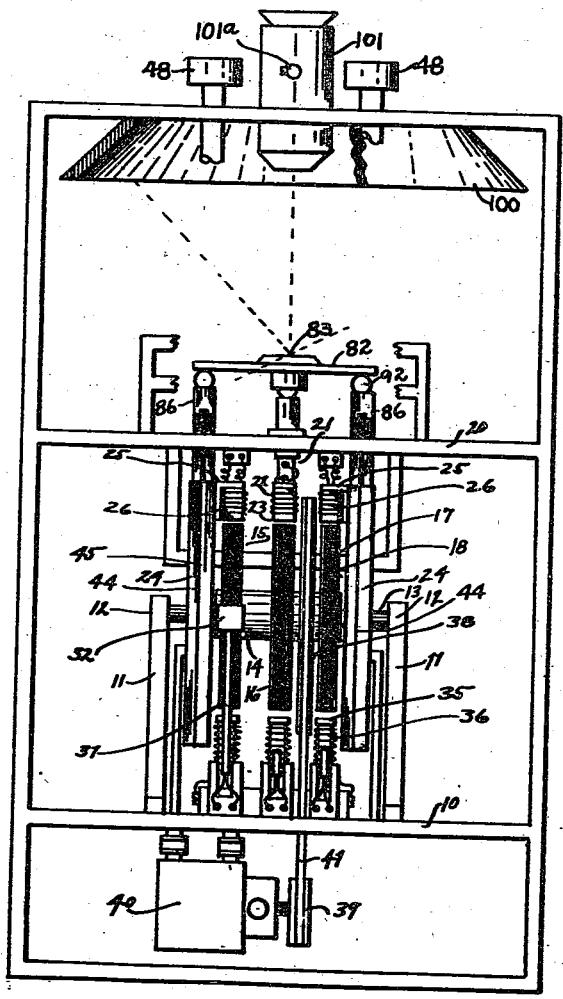
Figure 3:
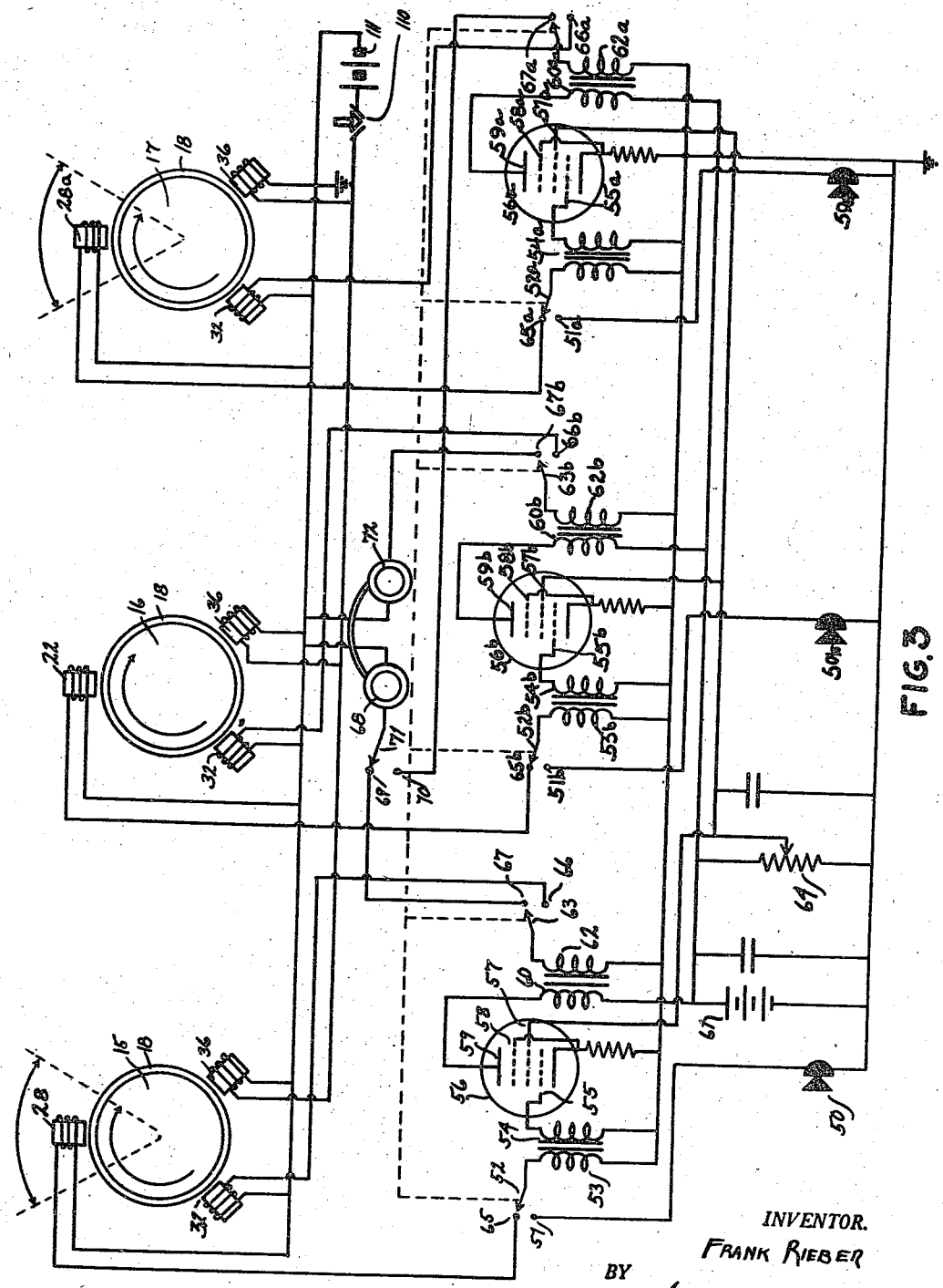
Figure 4:
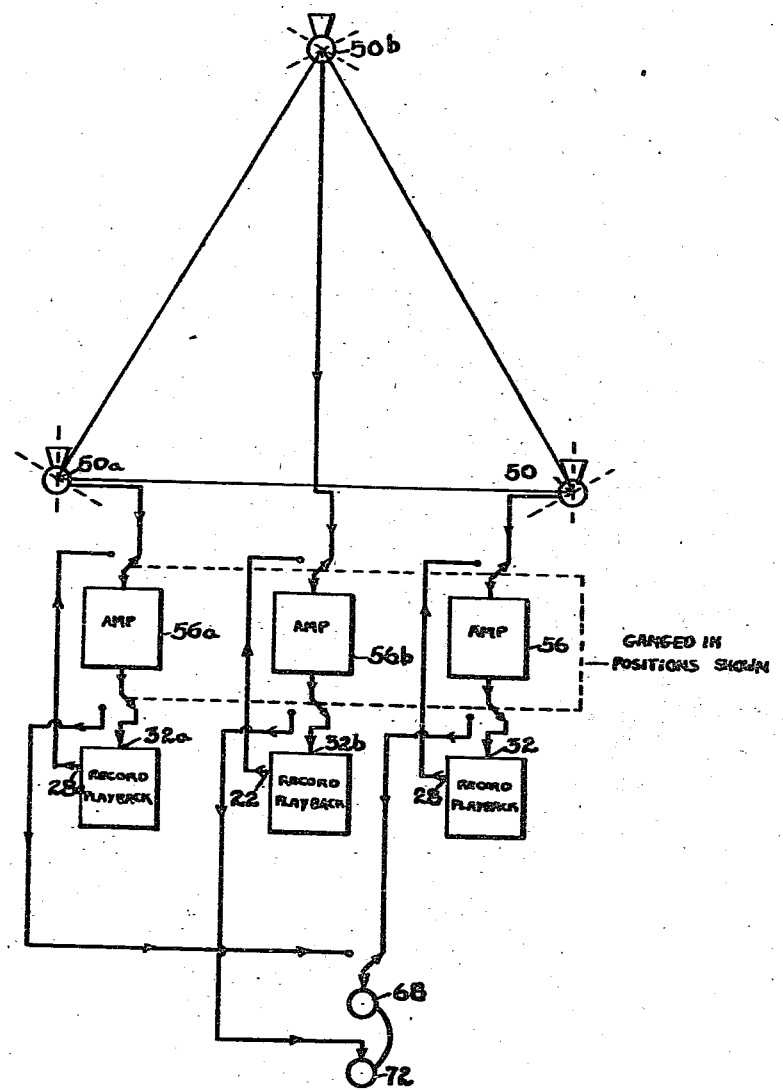
Figure 5:
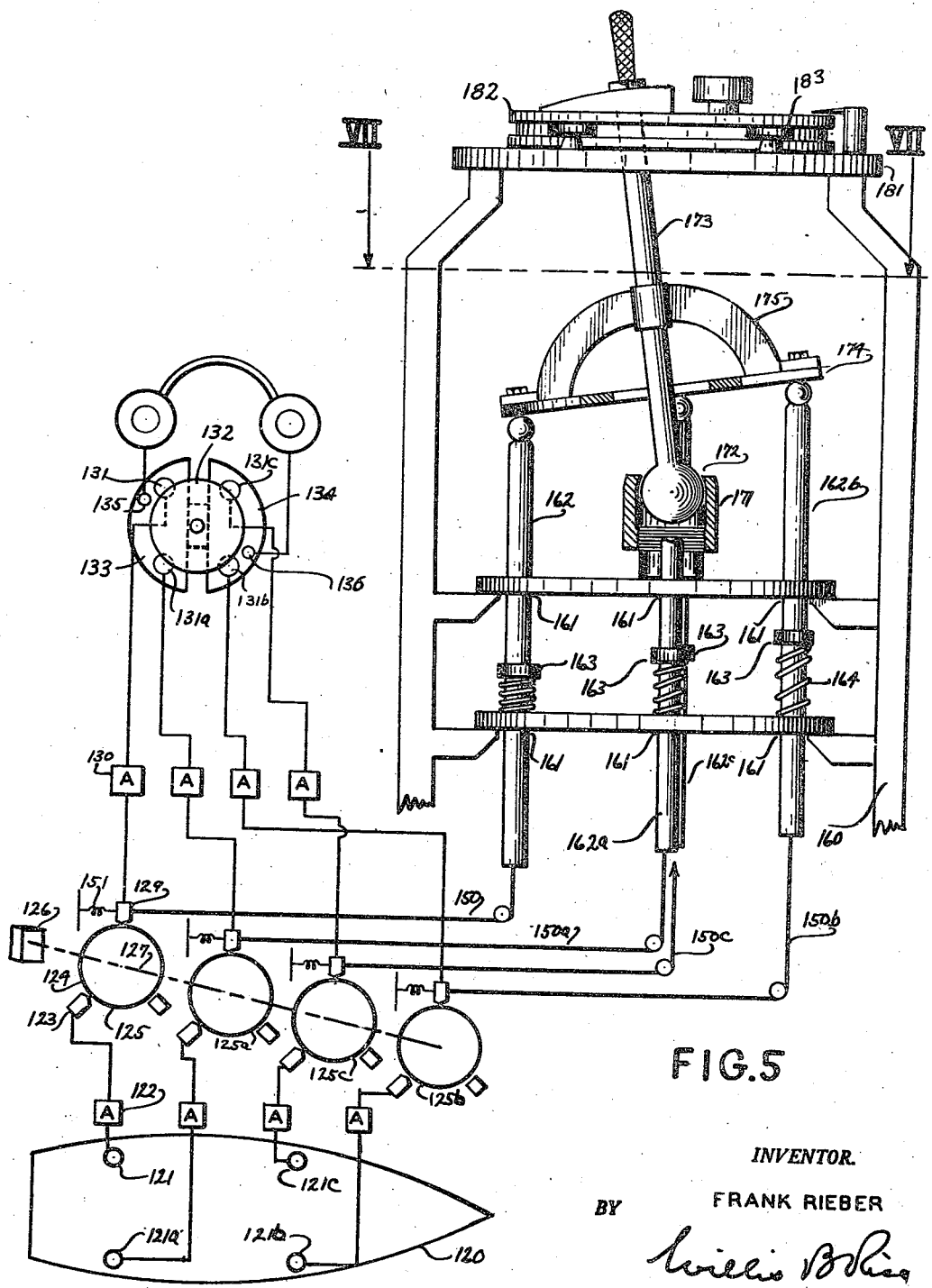
Figure 6:
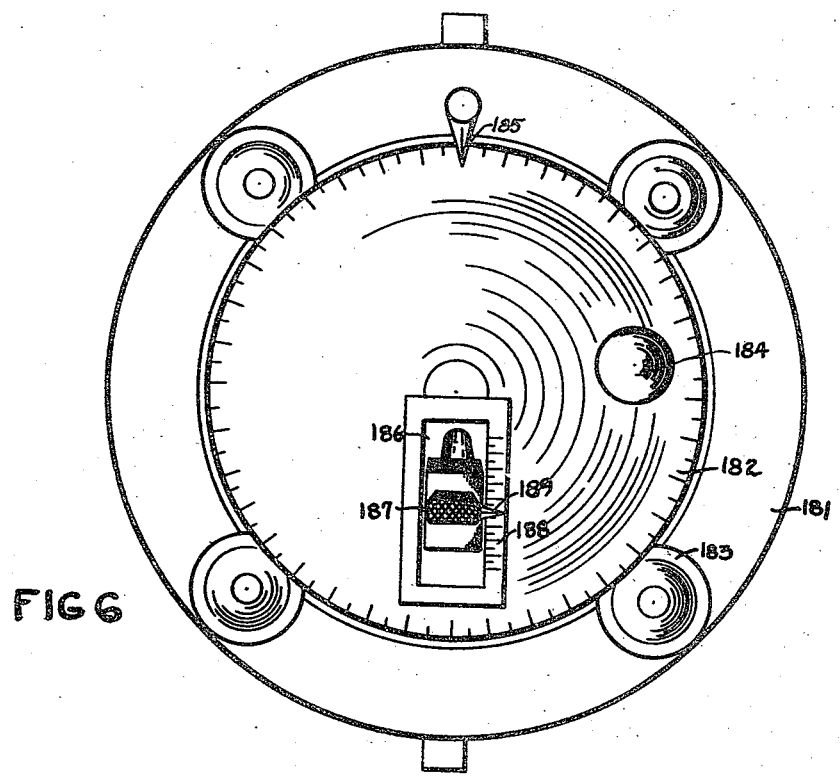
Figure 7:
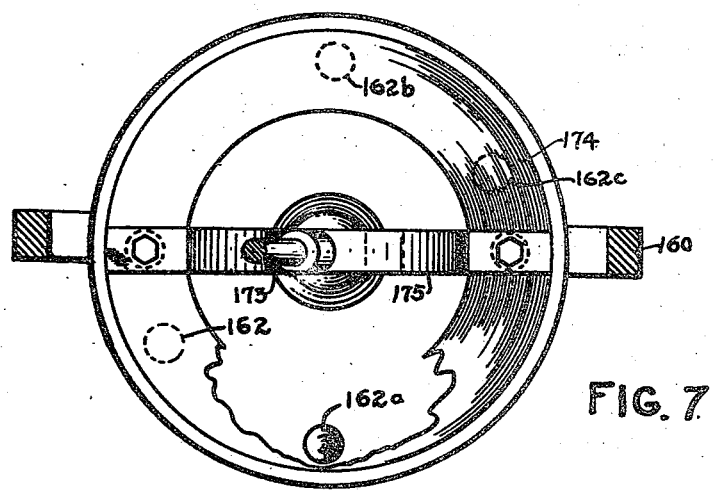

For a fuller understanding of the nature and objects of the invention, reference should be had to the following detailed description, taken in connection with the accompanying drawings, in which:

Fig. 1 is a side elevation of a device embodying this invention. Fig. 2 is a front elevation of the same. Fig. 3 is a wiring diagram of the device. Fig. 4 is a schematic diagram of the apparatus. Fig. 5 is an elevation partly in diagram showing a device for locating the direction of a continuous sound, such as out of a submarine. Fig. 6 is a top plan view of the same. Fig. 7 is a section on the line 7—7 of Fig. 5 looking in the direction of the arrows.

In the form chosen for illustration, the device primarily consists of a plurality of sound recording devices, each making its record on an element, the elements being driven at a common speed, so that any difference in the time of making the record, caused, for example, by the difference in time it takes for the sound to reach respective microphones, will be represented by a physical spacing of one record with regard to the other in the direction of movement corresponding to the distance traveled by the record during the time interval to be determined. Thus this space interval itself becomes a measure of the time interval.

In the making of such records, it is desirable that the material on which the record shall be made shall be moved in a closed cycle, that is, shall be in the form of a continuous strip, ribbon or disc, but this introduces difficulties in the production of such a continuous record. In my copending application for an acoustic reservoir filed on May 19, 1944, and bearing Serial No. 536,407, I have shown an instrument in which these difficulties are overcome, and the type of record disclosed therein is eminently suitable for use with this invention. Briefly, the recording surface therein described is formed by winding a magnetic wire spirally upon the surface of a drum with the adjacent coils close together or in contact.

The record making element comprises a small magnet having a core with a chisel shaped edge closely adjacent to or lightly resting upon the outer surface of that wire and bridging across between a number of turns. With such a recording surface, there is no serious discontinuity, for, while once during each revolution, the magnet core passes off of one turn at one end of the coil and onto another turn at the other end of the coil, this is done somewhat gradually and it is only one of a number of turns, so that no objectionable noise is introduced.

Referring now to Figs. 1, 2 and 3 of the drawings, the numeral 10 represents a frame having uprights 11 in which is journaled at 12 a shaft 13. On the shaft 13 is fixed a drum 14, and on each end of the drum and in the middle thereof are attached discs 15, 16 and 17. Each of these discs has wound upon its outer surface a steel wire 18 with the turns in contact, or close to each other, and this wire may, if desired after it is wound, have its outer surface ground down to give a more or less continuous flat recording surface to the drum.

Mounted upon the frame is a table 20, to the underside of which is attached at the center a block 21 carrying an electromagnet 22, having a small chisel shaped point 23, slightly spaced from or riding upon the outside surface of the wire 18. Mounted at each end of the cross bar 29 and rotatable on the shaft 13 is a ring 24. These two rings and the parts connected to them are identical in construction, and this description therefore applies to each. This ring 24 carries upon its face toward the disc 15 or 17, a bracket 25 supporting a small magnet 26 identical in construction with the magnet 22 and in alignment with or touching the record surfaces of the discs 15 and 17 respectively. In this manner, whereas the magnet 22 is fixed relative to the frame 10, magnets 28 may be rotated to any one of a number of angular positions with regard thereto. These three magnets constitute the reproducing magnets, as will hereinafter be described.

Three recording magnets are provided, one for each of the discs 15, 16 and 17. These magnets are identical in form and this description therefore applies to all three. Mounted upon the base 10 is a bracket 30 pivotally carrying an arm 31 which in turn supports a magnet 32. This magnet may be urged against the wire 18 by means of a spring 33 connected between the arm 31 and a stationary arm 34 upon the bracket 30. As will be observed from the drawing, these recording magnets are, for the sake of convenience, situated substantially in quadrature with the reproducing magnets. A plurality of wiping magnets are also provided, one for each of the discs, and these magnets are also identical in construction so that this description will apply to all three. This magnet comprises a core 35 extending upwardly from the base 10 and having a coil 36 thereon, the core extending upwardly to a point close to or resting upon the wire 18. These wiping magnets are much more powerful than the other magnets and the pole faces are relatively broad so that when these magnets are energized, all localized magnetization is destroyed.

Means are provided for rotating the drum 14 and the discs 15, 16 and 17 at a fixed rate of speed, comprising a pulley 38 upon the drum connected to a pulley 39 upon the shaft of a motor 40 by a belt 41 or other form of positive drive. The motor is preferably of the synchronous type, in order that the speed of the drum may be as nearly invariable as possible.

With the above construction it will be clear that when a series of impulses is sent through the magnets 32, a corresponding record will be made upon the recording surfaces, and this record will remain upon the surface until the coil 36 is energized to destroy it. Whenever this record passes beneath the magnet 22 or 28, an electrical impulse will be generated, which may be utilized as hereinafter described. If, therefore, a record be made upon the central disc 16, which is followed by subsequent but otherwise identical records upon the discs 15 and 17, the reproduction of these records may be brought into complete synchronism by rotating each of the magnets 28 to the point where the reproduced sound is synchronous with the sound from the disc 16. The angle of rotation of the rings 24 is therefore a measure of the time interval between the sound impulses.

In order to provide a convenient means of accurately rotating the rings 24, each of these rings has cut in its outer surface a groove 44, in which is carried a wire 45 which is carried upwardly through the table 20 over a pulley 46 and wrapped around at 47 a vertically journaled stem 48. Because the stem 48 is of much smaller size than the ring 24, the twisting of the stem 48 serves as an accurate means of rotating the drum.

The electrical connections for bringing about these results are shown in Fig. 3, in which there is shown a microphone and amplifying device for each of the discs, the circuits in this respect being identical and only one will be described except at the point where they become different. On the drawings the elements connected to the disc 17 will bear the subscript "a" and those connected to the disc 16 will bear the subscript "b." The numeral 50 represents a microphone connected to one pole 51 of a switch having a knife blade 52 connected to the primary 53 of a transformer, the secondary 54 of which is connected to the control grid 55 of an amplifier. The details of the amplifier form no part of this invention, but as here illustrated, a pentode 56 is provided with a screen grid 57 and a suppressor grid 58. The plate 59 is connected to the primary 60 of a transformer which is fed with energy from a battery 61, and the secondary 62 of this transformer is connected to the movable arm 63 of a switch. The screen grid 57 is connected to a potentiometer 64 for the purpose of securing volume control.

The movable arm 52 in its other position engages a contact 65 which is connected to the reproducer magnet 28 or, in the case of the disc 16, with the reproducer magnet 22, and the movable arm 63 in one position engages a contact 66 which is connected to the recording magnet 32. The movable arm 63 also engages in its other position a contact 67 which leads to one phone 68 of a telephone head set. At this point the circuits from the three records differ in that the point 67 of the record 15 and the point 67a of the record 17 are connected respectively to the upper contact 69 and the lower contact 70 of a switch, the movable arm 71 of which serves as the means for connecting these points to the ear phone 68, whereas the contact 67b of the record 16 is connected directly to the ear phone 72 without the interposition of such a switch.

The arms 52 and 63 of all of the switches may conveniently be ganged together so that all are in the uppermost or all in the lowermost position simultaneously. With all these switches in the lowermost position, it would be clear from the above description that the microphones 50 will be connected through the amplifiers with the recording magnets 32, thus producing a record upon the record surface. This record will remain upon the record surface and will pass under the reproducing magnet 28 or 22 once for each revolution of the drum. If now we raise all the movable arms simultaneously, we disconnect the microphones, but we connect the magnets 28 or 22 through the amplifiers, the magnet 22 being connected to the ear phone 72 and the ear phone 68 being connected to the magnet 28 on either the disc 15 or 17, depending upon the position of the arm 71. In either case, the ear phones 68 and 72 present to the brain two identical records, out of time sequence.

Let us assume for a moment that the movable arm 71 is in its upper position and that the ear phone 68 is reproducing the record from the drum 15. If now we rotate the ring 24 adjacent to the drum 15 by means of the stem 48, we will bring the reproduction from that disc into exact synchronism with the reproduction from the disc 16. Now by switching the arm 71 and by corresponding action, we can bring the record from the disc 17 into exact synchronism with that of the disc 16. When this has been accomplished it will be clear that the motion of rotation of the rings 24 will represent accurately the time delay between the receipt of the individual signals.

Means are provided upon this device for interpreting the results directly in terms of the direction from which the sound is derived, and to this end there is mounted upon the table 20 a post 80, on the upper end of which there is pivoted by a universal joint 81 a plate 82 carrying a mirror 83.

Carried also by the table 20 is a bracket 85, and a shaft 86 is slidable vertically in a bearing 87 in the table and a bearing 88 in the bracket 85. This shaft 86 has an arm 89 which may be clamped by a screw 90 about a vertical stretch of the wire 45, so that the upward motion of the shaft 86 corresponds exactly to the angular rotation of the drum upon which the wire 45 is wound. Two such shafts 86 are provided, one connected to each of the wires 45 and hence one responds to the rotation of the ring 24 upon the right side, as seen in Fig. 2, and one corresponding to the rotation of the ring upon the left side. Each of these shafts 86 is provided at its upper end with an anti-friction surface 92 by which it engages the table 82, and the ball and socket joints 81 and the surfaces 92 are arranged in a pattern corresponding to the pattern in which the microphones 50 are placed to receive the sound signal, that is, the microphones will preferably be placed in an equilateral triangle, and so will these bearings for the plate 82.

For the purpose of giving an intial adjustment of the plate 82, I may provide a threaded engagement 93 between the shaft 86 and the arm 89, and this arm may be clamped by a screw 94 when the adjustment has been made. Surrounding the vertical axis through the shaft 80 is a dial 100, comprising a section of a spherical surface preferably graduated in some suitable manner, as for example by the points of the compass or by degrees, and an eye piece 101 is placed along the axis and focused at the dial.

With this construction it will be clear that the table 82, and consequently the mirror 83, will be tilted in a direction dependent upon the position of the shafts 86 with reference to the post 80, corresponding to the shifting required to synchronize the reproduction, and this difference will be directly indicated by that portion of the dial which is seen through the eye piece 101.

A source of illumination may be provided, optically so placed as to cast a sharp image on the scale by reflection from the mirror without interfering with the vision. The exact location of such source of illumination will depend upon the optical system employed. It is here diagrammatically illustrated as a miniature lamp at 101a, which will be shielded to prevent it shining directly into the eyes of the operator.

If the instrument were always used under conditions which provided the same speed of sound, the image upon the dial 100 would travel in a circle. If, however, for any reason the rate of travel of sound should change by reason of weather conditions or by reason of the sound coming in at an angle to the horizontal, then the proportional shift of the shafts 86 relative to each other will not be altered, but the absolute value of the movement of each of these will change. It follows that the portion of the dial image which will be reflected into the eye piece will, under such circumstances, move toward the zenith or toward the horizon, but will not change its angular position so that it will continue to indicate the direction from which the sound is received.

This apparatus may be operated very rapidly by reason of the fact that when the two reproductions of the same sound are not simultaneous, a blur occurs which is distinctly noticeable, but when the records become superposed by rotating one of the rings, this blurring ceases and the point at which it ceases is sharp, so that the point of registry may be found quite readily. The discs 15 and 17 are adjusted sequentially, but the operation is so quick that no objectionable delay occurs, and as soon as the three records are simultaneous, the direction from which the sound is emanating is immediately visible in the eye piece.

When a plurality of different sounds are recorded coming from a plurality of directions, these may be separately identified by rotation of the rings because at one point one of these records will come out sharply, whereas the records of all the other sounds will be blurred. Then, if without wiping the record clean we rotate the rings to a different point, we blur the records of the sound to which the device has previously been adjusted and bring a different sound into registry, but in each instance the sound which has been brought into registry will lie in the direction indicated by the portion of the dial visible in the eye piece. When the recording of the sound has been complete and the records are no longer desired, the entire record surface may be wiped clean. To accomplish this result, the magnets 36 may be operated through the medium of a switch 110 arranged to actuate the magnets by the battery 111. Thereafter the entire procedure may be repeated.

In the embodiment of the invention disclosed in Figs. 5, 6 and 7, there is shown a location, as for example a vessel 120, on which are arranged a plurality of microphones 121, 121a, 121b and 121c. For reasons which will hereinafter be made clear, these microphones may be put in any desired place. They should, however, be given a wide separation in both horizontal directions in order to get the most sensitive results. The circuits of these microphones are identical and therefore only one need be described. The same numbers will be utilized but with the subscripts a, b and c to indicate the similar parts of the circuits.

The microphone 121 is connected to an amplifier 122 and the output of the amplifier is connected to a recording magnet 123 of the type and kind disclosed in my copending application hereinbefore referred to. Sufficient here to state that the magnet 123 is arranged to create a local magnetization upon a record surface comprising a plurality of adjacent coils of wire 124 wound upon a cylinder 125, this cylinder in turn being driven by a synchronous motor 126 through a shaft 127 at a speed such as will take care of the maximum time interval which the device will have to record within about one-half of one revolution of the cylinder.

Mounted upon a suitable movable ring similar to that previously described in connection with Figs. 1-3 at 24, is a play-back magnet 129. This play-back magnet is connected through an amplifier 130 to a terminal 131 of a gang switch. This switch is designed particularly to enable one-half of all the microphones to be connected to one ear of a split telephone head set and the other half to be connected to the other ear piece, but to enable the operator to determine by test which of the group of microphones shall be grouped together. As herein illustrated, the various terminals 131, 131a, 131b and 131c are arranged about a circle, above which there may rotate an insulating disc 132 having substantial semi-cylindrical conducting plates 133 and 134 upon its underface, so that in any position of the disc 132 one-half of the contacts 131 will be connected to one conducting plate, and the other half will be connected to the other conducting plate. As is shown, this may be accomplished by placing a second set of contacts 135 and 136 beneath the plates 133 and 134. The contact 135 is connected to one-half of the head set and 136 to the other half, and thus in every operative position of the disc 132 it connects two of the reproducing magnets to the head set. It has been mentioned before that the rings for magnet 129 are shiftable about the shaft 127, and since these rings support the play-back magnets 129, and since the records upon the recording wires are fixed in their relation to each other, this shifting will alter the relative times at which the play-back magnets reproduce the sound. This shifting of the play-back magnets is accomplished by a wire 150 which wraps around the outer surface of the magnet support, as has been already described, and is urged in one direction by a spring 151 and pulled in the other direction in a manner about to be described.

The numeral 160 represents a frame having a plurality of upright bearings 161, in each of which is slidably mounted a vertical post 162, 162a, 162b and 162c, each having a collar 163, beneath which there is a spring 164 to urge the post 162 to its uppermost position. This post 162 is directly connected to the wire 150 which is carried over suitable pulleys 163 for this purpose. Thus it will be seen that when the rod 162 is pushed inwardly against the action of the spring 164, tension is relieved upon the wire 150 and the spring 151 moves the reproducing magnet 129 and hurries the time relative to the other records at which the record on the cylinder 125 is reproduced.

The delay in any signal record will, it is clear, be in proportion to the distance between the first microphone and the microphone producing that record measured in the direction of travel of the sound. It follows that if the posts 162 are positioned in the same configuration as the microphones, and if they are of proper length, their upper ends will at all times define a plane, which plane will tilt in a direction corresponding to the direction of sound, but the inclination of the plane will, the speed of motion of the record surface being fixed, be proportional to the effective velocity of sound.

Similarly, if the inclination of the plane be adjusted to the velocity of sound, and a plate or table be made to lie in that plane, engaging those upper ends, and designed to have its inclined axis rotate about the center axis of the device with the proper inclination, then the rotation of the plate or the axis of the plate will adjust all the microphones simultaneously in exact proportion. This latter system is here disclosed.

There are, therefore, the same number of posts 162 upon this instrument, as there are microphones aboard the vessel, and they are disposed according to the same pattern.

We have shown this invention as here applied with four microphones, solely for the purpose of simplifying the drawing. In fact, the number of microphones will generally be much greater than four and each will have its circuit like the circuit disclosed for the microphone 121. Each will be connected to its own terminal of switch 132 through its own acoustic reservoir in proper sequence around the circle. Each acoustic reservoir will have its movable arm connected in the same sequence to a corresponding post 162.

By making the positions of the posts correspond accurately to the positions of the microphones 121, the proportions are maintained so that any number of microphones desired may be used, and yet nevertheless the instrument will accurately respond to them.

To operate the instrument, there is provided a socket 171 centrally disposed within the group of posts, and this socket serves as bearing for a ball 172 which is attached to a rod 173. Mounted upon this rod 173 is a disc 174 braced from the rod by brackets 175, so that at all times the inclination of the rod will be an accurate measure of the amount and direction of the inclination of the disc.

Extending upwardly from the frame 160 is a circular frame 181 coaxial with the socket 171, and mounted upon this frame is a circular dial 182 positioned by anti-friction rollers 183. A handle 184 enables the dial 182 to be rotated at will, and an indicator 185 carried by the table 160 indicates the angle through which the dial has been turned.

The rod 173 extends upwardly through a slot 186 in the dial 182, so that the tilting of the disc 174 may be adjusted by a handle 187 on the upper end of the rod 173 above the dial, and the edge of this slot 186 may be graduated, as shown at 188, to cooperate with an indicator 189. In a central position the disc 174 is inclined the proper amount for a normal sound velocity, but by changing the tilt of the disc slightly, it may compensate for other sound velocities at will.

With the foregoing construction, with the synchronous motor 126 rotating at the proper speed, and with the handle 187 adjusted to give a normal inclination of the table, and with the ear phones 139 and 140 on the ears, we may shift the switch 132 to get the greatest possible difference between the responses in the ear pieces 139 and 140. Thereafter we may employ the handle 184 to rotate the dial 182 about its axis, and in this manner by means of the rod 173, to rotate the disc about the same axis.

During this rotation, by reason of the inclination of the disc, the various rods 162 will be depressed in precisely the right proportion to compensate for the geographical position of the microphones with which they are connected, and thus the sound coming from the sound source will automatically be brought into absolute synchronism in all the microphones at the same time, and at that point the indicator will indicate upon the dial 182 the precise direction from which the sound emanates. If the sounds cannot be brought into absolute synchronism, it may be necessary to tilt the disc 174 slightly more or less by means of the handle 187, and this tilting may in turn mean a slight readjustment of the direction of the tilt of the disc. In any case, the tilt of the disc will indicate whether the sound wave is moving between the microphones at a rate corresponding to the normal velocity of sound, and if there be any material departure, this departure may be interpretable in terms of weather, or that the sound is approaching at an angle to the horizontal.

The purpose of the switch 132 is at all times to get the maximum binaural effect in the telephone head set, and this will ordinarily be accomplished when the division line between the plates 133 and 134 extends substantially in the direction from which the sound is believed to come.

I have referred to the motor driving the sound record discs as of the constant speed type, such as a synchronous motor, because such a constant speed has advantages in limiting the number of variables to be controlled, and when the actual speed is constant, inclination of the disc may be interpreted in terms of other factors, such as the vertical angle of approach of the sound wave. It will be clear, however, that a change in motor speed will not alter the direction in which the disc tilts, but only change its degree of inclination. In the embodiment of Figs. 1-4, therefore, a change of motor speed would not change the functioning of the instrument, but would merely move the line of sight upon the scale either toward the horizon or toward the zenith, without changing the reading.

In the embodiment of Figs. 5-7, it would merely require a change in the setting of the rod 173 to correspond to the new motor speed.

It will also be obvious that since the angle of inclination of the disc and the motor speed are inverse factors we may, if desired, hold the inclination constant and alter the motor speed to compensate for different effective horizontal velocities of sound. In such case, the motor speed itself may be interpreted in terms of the vertical angle of approach. Thus it will be seen that the proportionate magnitude of the different sound reproductions is controllable independent of their timed relation, and that the timed relation can be controlled independent of the proportion.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A device for locating the origin of a sound in response to the impulses received from a plurality of microphones arranged in a two dimensional pattern, comprising for each microphone a recording surface traveling at a constant rate, a recording magnet for recording on said surface impulses from said microphone, and a play-back magnet actuatable by said record, said record surfaces being driven in fixed time relation and at least all but one of said play-back magnets being movable each with regard to its recording magnet, and means for causing said motion, sound reproducing means operable by said play-back magnets and vertically movable means for evaluating the combined resultant position of said play-back magnets in terms of direction.

2. A device for locating the origin of a sound in response to the impulses received from three microphones arranged in a two dimensional pattern, comprising for each microphone a recording surface traveling at a constant rate, a recording magnet for recording on said surface impulses from said microphone, and a play-back magnet actuatable by said record, said record surfaces being driven in fixed time relation and two of said play-back magnets being shiftable each with regard to its recording magnet, and independent means for causing said shifting, means for independently indicating the synchronism between the record produced by the shiftable magnet and the record produced by the other magnet, sound reproducing means operable by said play-back magnets and vertically movable means for evaluating the combined resultant position of said play-back magnets in terms of direction.

3. A device for locating the origin of a sound in response to the impulses received from a plurality of microphones arranged in a two dimensional pattern, comprising for each microphone a recording surface traveling at a constant rate, a recording magnet for recording on said surface impulses from said microphone, and a play-back magnet actuatable by said record, said record surfaces being driven in fixed time relation and at least all but one of said play-back magnets being movable each with regard to its recording magnet, and means for causing said motion, sound reproducing means operable by said play-back magnets and means for evaluating the shifting of said play-back magnets in terms of direction, comprising a plurality of elements, arranged in the same pattern as the microphones and at least all but one of said elements being each connected to one of said play-back magnet moving means, constructed and arranged to move an amount proportional to the movement of the play-back magnet to which it is connected, said members being movable in parallel directions, and a plane surface carried by said elements constructed and arranged to be tilted by any movement of said elements, whereby the direction of tilting of said plane indicates direction.

4. A device for locating the origin of a sound comprising a plurality of microphones arranged in a two dimensional pattern for receiving said sounds, and for each of said microphones a recording surface traveling at a constant rate, a recording magnet for recording on said surface, impulses from said microphone, and a play-back magnet actuatable by said record, said record surfaces being driven at the same speed, and at least all but one of said play-back magnets being movable each with regard to its recording magnet and means for causing said motion, sound reproducing means operable by said play-back magnets and vertically movable means for evaluating the combined resultant position of said play-back magnets required to bring said reproduced sounds into unison in terms of origin of the sound impulses reaching the microphones.

5. A device for locating the origin of a sound comprising a plurality of microphones arranged in a two dimensional pattern for receiving said sounds, and for each of said microphones a recording surface traveling at a constant rate, a recording magnet for recording on said surface, impulses from said microphone, and a play-back magnet actuatable by said record, said record surfaces being driven at the same speed, and at least all but one of said play-back magnets being movable each with regard to its recording magnet and means for causing said motion, sound reproducing means operable by said play-back magnets and means for evaluating the movement of said play-back magnets required to bring said reproduced sounds into unison in terms of origin of the sound impulses reaching the microphones, comprising a plurality of elements, at least all but one of said elements being each connected to one of said play-back magnet-moving-means constructed and arranged to move an amount proportional to the movement of its play-back magnet, said members having parts moving along parallel lines positioned in the same pattern as said microphones, and a plane surface tilting in accordance with the motion of said parts, and means for determining the direction of said tilting.

6. A device for evaluating the difference in time of arrival of a sound wave at different stations in terms of direction, comprising a plurality of elements at least all but one of which are movable along parallel lines and arranged in a predetermined two dimensional configuration in accordance with the configuration of the intended stations, said elements terminating in a plane, means for moving at least all but one of said elements to tilt said plane, and means for measuring the direction of maximum inclination of said plane.

7. A device for evaluating the difference in time of arrival of a sound wave at different stations in terms of direction, comprising a plurality of elements at least all but one of which are movable along parallel lines and arranged in a predetermined two dimensional configuration in accordance with the intended stations, said elements terminating in a plane, means for moving at least all but one of said elements to tilt said plane, and means for measuring the direction of inclination of said plane irrespective of the angle of tilt comprising a mirror upon said plane, upon the axis of rotation of tilt of said plane, a scale circumferentially disposed about said axis in position to be in alignment with a line of sight passing down said axis to said mirror and reflected by said mirror to said scale.

8. A device for evaluating the difference in time of arrival of a sound wave at different stations in terms of direction, comprising a plurality of elements at least all but one of which are movable along parallel lines and arranged in a predetermined two dimensional configuration in accordance with the intended stations, said elements terminating in a plane, means for moving at least all but one of said elements to tilt said plane, and means for measuring the direction of inclination of said plane irrespective of the angle of tilt comprising a mirror upon said plane, upon the axis of rotation of tilt of said plane, a scale circumferentially disposed about said axis in position to be in alignment with a line of sight passing down said axis to said mirror and reflected by said mirror to said scale, and a source of illumination for said scale and an eye piece situated along said axis.

9. A device for evaluating the difference in time of arrival of a sound wave at different stations in terms of direction, comprising a plurality of elements at least all but one of which are movable along parallel lines and arranged in a predetermined two dimensional configuration in accordance with the intended stations, said elements terminating in a plane, means for moving at least all but one of said elements to tilt said plane, and means for measuring the direction of inclination of said plane irrespective of the angle of tilt comprising a mirror upon said plane, upon the axis of rotation of tilt of said plane, a scale circumferentially disposed about said axis in position to be in alignment with a line of sight passing down said axis to said mirror and reflected by said mirror to said scale, and a source of illumination directing a beam of light along said axis against said mirror.

10. A device for locating a sound origin comprising a plurality of sound records, each corresponding to the impact of the sound at a station, said stations being arranged in a two dimensional pattern, a play-back device for each of said records, at least all but one of said play-back devices being movable, means for simultaneously reproducing said sound from said play-back magnets, and common means for simultaneously altering the relative positions of all of said play-back magnets, each in a degree corresponding to the positions in the pattern to which said record corresponds.

11. A device for locating a sound origin comprising a plurality of sound records, each corresponding to the impact of the sound at a station, said stations being arranged in a two dimensional pattern, a play-back device for each of said records, at least all but one of said play-back devices being movable, means for simultaneously reproducing said sound from said play-back magnets, and common means for simultaneously altering the relative positions of all of said play-back magnets, each in a degree corresponding to the positions in the pattern to which said record corresponds, comprising a plurality of vertically moving posts, each connected to a play-back magnet, said posts being arranged in a pattern corresponding to the same pattern to which said records correspond, a disc for simultaneously engaging all said posts, means for tilting said disc whereby the tilting of said disc in any direction alters the time of play back of said records, each in proportion to its position in the pattern, and means for rotating the axis of said tilted disc about a vertical axis.

12. A device for evaluating the relative position of three sound producing devices into direction, comprising three vertical posts, one corresponding to each of said sound producing devices arranged in two dimensional pattern corresponding to the position of the sound producing devices and at least all but one of said devices being connected to its corresponding post, a mirror connected to all of said posts to be tilted by any unequal motion thereof, an annular scale surrounding said mirror at an angle to said mirror equal to twice the angle of tilt of said mirror.

13. A device for evaluating the relative position of three sound producing devices into direction, comprising three vertical posts, one corresponding to each of said sound producing devices to take a position corresponding to the two dimensional pattern of the sound producing devices and at least all but one of said devices being connected to its corresponding post, a mirror connected to all of said posts to be tilted by any unequal motion thereof, an annular scale surrounding said mirror at an angle to said mirror equal to twice the angle of tilt of said mirror, and an eye piece on the axis of said scale in position to view said scale in said mirror.

14. A device for simultaneously adjusting the time of play back of a plurality of records of the same sound to bring them into unison, said records each corresponding to the time of arrival of the sound at a different station, arranged in a two dimensional pattern, said device comprising a plurality of members at least all but one of which are shiftable in parallel paths and spaced in accordance with the predetermined pattern, each of said members being connected to alter the time of play back of the record to which it is connected in proportion to the movement of said member, a disc for simultaneously engaging all of said members and movable with the shifting of each, means for tilting the axis of said disc to an inclined position, and means for rotating said inclined axis about a vertical axis whereby each of said members will be depressed or released in proportion to its distance from the axis of rotation and in timed relation dependent on the pattern, and means for determining when the record reproductions are brought into harmony.

15. A device for locating a sound origin comprising three discs, each bearing sound records corresponding to the time of arrival of a sound at three separate stations arranged in known two dimensional pattern, a play-back device for each disc at least all but one of which is movable about the axis of the disc, a wire for controlling the angular position of said movable play-back devices, each of said wires being connected to a table and extending transverse to the table, whereby the movement of either wire will tilt the table, an annular scale, means upon the table for reflecting a narrow beam of light between a vertical axis and said annular scale, a reproducer operated by one of said play-back members, a second reproducer, and a switch for selectively connecting said second reproducer to either of the other play-back members whereby the table may be tilted by movement bringing the reproduced sounds into unison.

16. A device for evaluating the movement of sound records corresponding to a certain station pattern in terms of direction comprising a plurality of parts, at least all but one of which is vertically shiftable and, connected to alter the time of play back of one of said records, said posts being arranged according to the same two dimensional station pattern to which said records correspond, a disc simultaneously engaging the upper ends of all of said posts, said disc being tiltably supported about a pivot intersecting a vertical axis, a rod extending upwardly normal to the disc by which the angle of tilt may be altered, a dial member concentric to said vertical axis and an indicator member, one of said members being mounted for rotation about said vertical axis, connections between said rotatable member and said rod constructed and arranged to cause said rod and said rotatable member to rotate together, whereby the relative position of said indicator and dial corresponds to the direction of origin of the sound and the angularity of tilt of said disc corresponds to the relative size of the pattern of the stations to which the records correspond.

17. A device for locating the origin of a sound from the electric responses of microphones placed in a pattern, comprising for each microphone response a record surface driven by a motor, a recording device for connection to said microphone, a play-back device operable by said record, means for at least all but one of said play-back devices for moving each of said movable play-back device relative to its corresponding recording device, means for reproducing sound from all said play-back devices, said at least all of but one of said moving means each having an element moving in a direction parallel to a common axis, an amount proportional to the movement of said play-back device, said elements being arranged in a configuration corresponding to said microphones, and a direction determining element supported by said elements, whereby the direction of origin of said sound is indicated by the direction of maximum inclination of said determining element irrespective of the speed of said record surface.

FRANK RIEBER.

REFERENCES CITED

The following references are of record in the file of this patent:

UNITED STATES PATENTS

| Number | Name | Date |
|---|---|---|
| 1,453,316 | Fessenden | May 1, 1923 |
| 964,380 | Bowlker | July 12, 1910 |
| 1,470,733 | Hayes | Oct. 16, 1923 |
| 2,166,991 | Guanella | July 25, 1939 |
| 1,729,595 | Hayes | Sept. 24, 1929 |
| 1,378,960 | Horton | May 24, 1921 |
| 1,502,243 | Fry | July 22, 1924 |
| 1,645,810 | Hubbard | Oct. 18, 1927 |
| 1,977,974 | Rudolph | Oct. 23, 1934 |
| 2,275,735 | Cloud | Mar. 10, 1942 |

FOREIGN PATENTS

| Number | Country | Date |
|---|---|---|
| 297,997 | Germany | Oct. 28, 1919 |
| 704,700 | Germany | Apr. 4, 1941 |